TUNING MECHANISM

Filed July 25, 1945 2 Sheets-Sheet 1

INVENTOR
JOSEPH E. LASCHENSKI
BY HIS AGENT
Carl H. Synnestvedt

April 4, 1950 J. E. LASCHENSKI 2,502,572

TUNING MECHANISM

Filed July 25, 1945 2 Sheets-Sheet 2

INVENTOR
JOSEPH E. LASCHENSKI
BY HIS AGENT
Carl H. Synnestvedt

Patented Apr. 4, 1950

2,502,572

UNITED STATES PATENT OFFICE 2,502,572

TUNING MECHANISM

Joseph E. Laschenski, Springfield, Pa., assignor, by mesne assignments, to Philco Corporation, Philadelphia, Pa., a corporation of Pennsylvania Application July 25, 1945, Serial No. 607,028

6 Claims. (Cl. 74—10.15)

The present invention relates to tuning devices for radio apparatus, and is especially concerned with tuning devices that are selectively operable to effect either manual or automatic tuning of the apparatus.

More particularly, the present invention has to do with those so-called "push-button" tuners for radio receivers, which tuners are of the type including a single movable frame member carrying a plurality of stops each adapted for individual cooperation with the frequency determining means, to establish a predetermined position thereof in correspondence with a desired preselected frequency. In one aspect, the present invention is concerned with tuners of the foregoing general class which, further, incorporate means for effecting power drive of the mechanism under the automatic condition of operation.

Such tuning devices, although of more general applicability, are frequently employed in radio apparatus of such size and character as to impose rigid limitations upon the space available for the tuning mechanism. Automobile radio receivers may be considered exemplary of one class of apparatus to which the device of the present invention is particularly applicable, and in which the space limitations are especially critical.

It is an important object of the present invention to provide a tuning device of the foregoing type, which is of a character presenting unusually small overall dimensions, without sacrifice of accuracy or dependability. To the foregoing general ends, my invention contemplates the provision of apparatus in which the power drive means, preferably electro-magnetic in nature, is positioned in generally unused space within the stop-carrying frame member.

In accordance with another aspect of the present invention, it is an important object to provide such a tuning device, in which positioning or indexing of the individual stops is completely established, prior to the tuning movement of the frequency-determining element.

In accordance with yet another feature of the invention, the present apparatus is of such a nature as to be automatically and sequentially conditioned for manual operation after a predetermined number of automatic actuations, and is capable of effecting the change-over, as between the manual and automatic modes of operation, without effort or attention on the part of the operator.

The invention extends further to certain novel constructional features and arrangements, hereinafter described and illustrated in the attached drawings, in which.

First briefly described, the illustrated embodiment of the invention comprises a multi-coil inductance tuner having a single movable cross-head, or carriage, to which the core members of the tuner are secured. This carriage is mounted for reciprocatory movements to vary the frequency-determining position of the inductance coils, such movements being effected in response to a suitable power drive means, such, for example, as a solenoid. As will appear more clearly hereinafter, a control element is provided which may be utilized to effect manual tuning of the apparatus, as well as to preselect the frequencies to which the receiver will respond under the automatic condition of operation, the latter by predetermining different adjustments of various stops adapted for individual and sequential cooperation with the aforementioned carriage. For the purposes of determining the movements of the carriage, and the tuning effect thereof, there is provided a rotatable frame member or "turret" which, in the embodiment illustrated, is of generally cylindrical form and carries a plurality of screw threaded members spaced about its periphery in parallelism with the rotational axis of said turret. The screw threaded members are arranged in equally spaced angular relation, in the present instance at 60° intervals about the frame member, and each of said members is provided with an adjustable stop. Step-by-step rotation of the frame member or turret, serves to bring said stops successively into position for engagement with the carriage, whereby said carriage may be differently positioned as it is brought into cooperation with each of the stops. As thus far described, the tuning device is of a known type frequently employed in association with small radio receivers, and the like.

Figure 1:
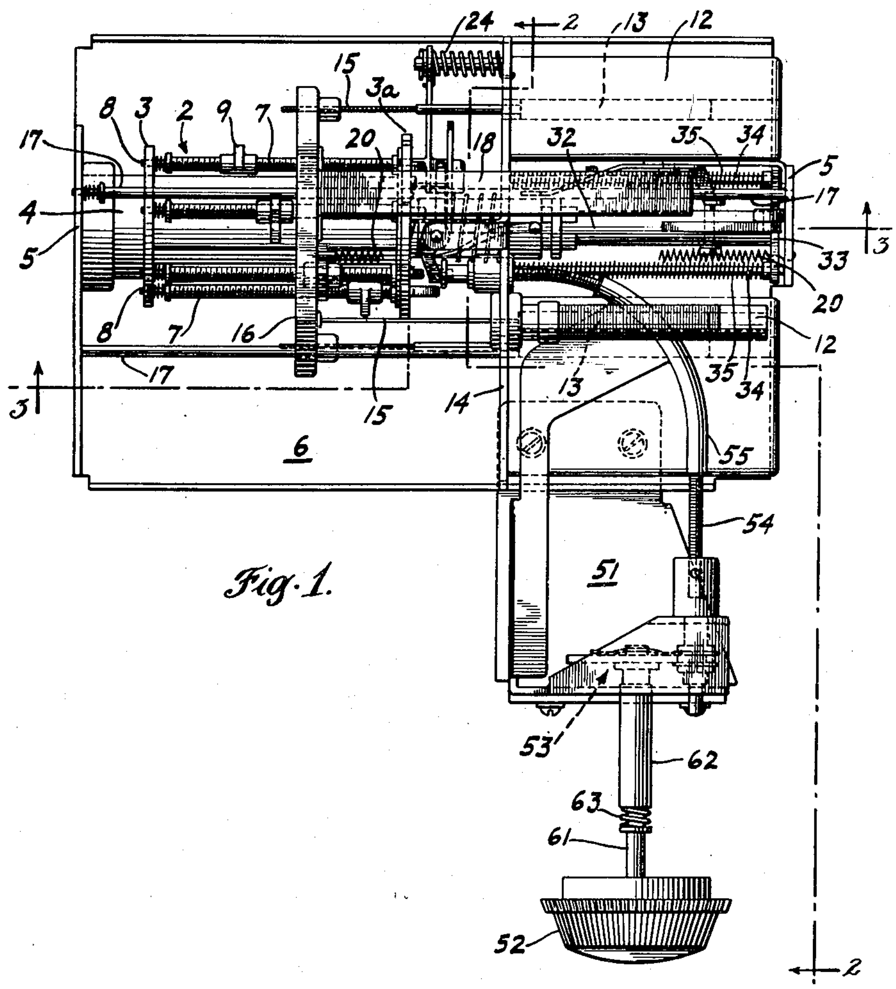
Figure 1 is a plan view of a tuning device incorporating the present invention.
Figure 2:
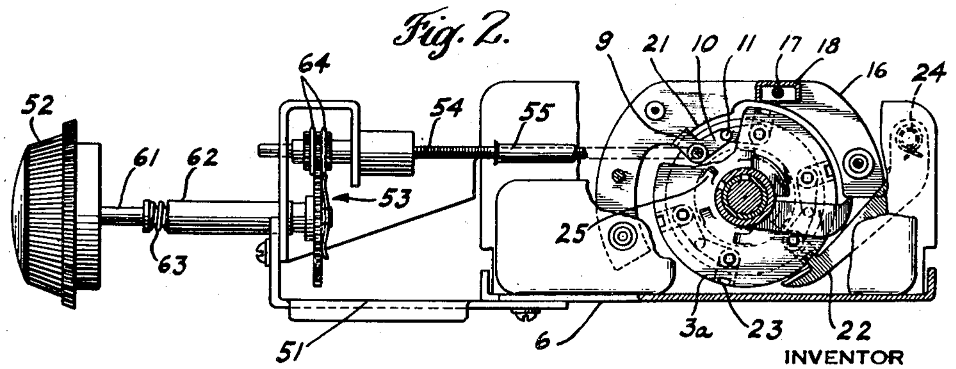
Figure 2 is a sectional, elevational view, taken substantially on the line 2—2 of Figure 1, with certain parts broken away, and others omitted, for the sake of clarity in illustration.
Figure 3:
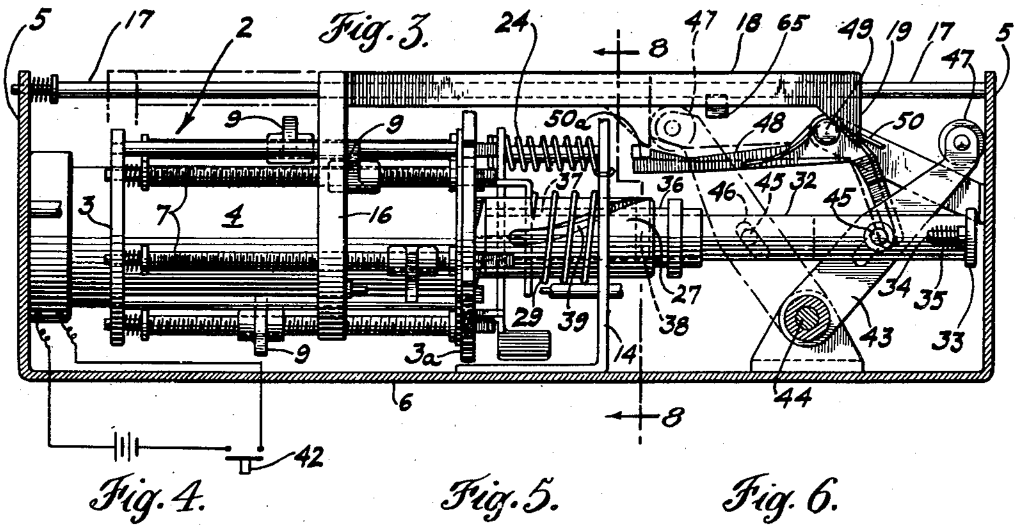
Figure 3 is a sectional, elevational illustration, on an enlarged scale, taken substantially on line 3—3 of Figure 1.

Referring now more particularly to the drawings, and with special reference to Figures 1 to 3, inclusive, the illustrated tuner incorporates a rotatable turret or stop-carrying member designated generally by the reference character 2, said member comprising a pair of spaced circular end plates 3, **3*a*, suitably journalled for rotatable movements on a central cylinder 4, said cylinder and other components of the mechanism being held between a pair of opposed flange portions 5—5, upstanding from a main frame 6. A plurality of threaded rod-like members 7 (in the present instance six are employed) are mounted between the end plates 3, 3*a*, said threaded members being provided with reduced end portions, extending through apertures provided in the end plates, as illustrated at 8. Each of the threaded rods 7 carries a stop member 9 and, as best appears in Figure 2, the several stops are provided with laterally turned projections 10 which cooperate with guide rods 11 secured between the end plates 3 in a manner similar to that employed with the threaded rods 7. Such cooperation is provided between the projections 10 and the rods 11, in order to prevent rotation of the stops 9 during adjustment of the threaded rods 7**, for a purpose which will appear more clearly hereinafter.

By way of example only, as it will be understood that other tunable elements could be employed, the apparatus includes tunable elements of the variable inductance type, each including a coil 12 and a powdered iron slug or core 13. In the mechanism as illustrated, two such tuning devices are provided, each constituting components of a radio receiving circuit of known type. As this general mode of radio tuning is well known, it is neither necessary to illustrate the radio circuit in detail, nor to show the connection of said tuning device thereto.

It will be observed that each of the coil devices 12 is supported toward one end by a plate 14 fixed to and upstanding from the main base plate 6. The core 13 of each tuning device is connected at its forward or outer end, by means of a screw or other suitable connector element 15, to a crosshead or carriage 16 which is mounted upon a pair of spaced guide rods 17—17 to accommodate sliding movements of the carriage 16 toward and away from the tuning device. These bars extend through suitable openings in said carriage and have their opposite ends journalled in the frame structure As most clearly appears in Figures 1 and 3 of the drawings, the carriage 16 is provided with a slide portion 18, extending at right angles from one side of said carriage member, said slide 18 having at its free extremity a downwardly turned foot 19 which is apertured to receive one of the guide rods 17. A tension spring, portions of which are shown at 20 in Figure 1, reacts between the right hand flange member 5 and the carriage 16, in such manner as to constantly urge said carriage toward the tuning devices 12, that is, in such direction as to return the cores 13 within the coils 12.

Mechanism is provided for moving the carriage 16 outward against the action of spring 20 and also for effecting a step-by-step selection of the various stop elements 9, which stops serve to fix the position to which the carriage 16 and the connected cores 13 are actuated, for each tuning position of the device. As will appear hereinafter, such outward movements of the carriage 16 are so coordinated with the step-by-step actuation of the stop-carrying frame member 2, as to bring the stops 9 progressively into a position in which they may cooperate with the carriage 16 to determine the position thereof. As seen in Figure 2, the inner arcuate edge of the carriage 16 is formed with a projecting flange portion 21, which is the only portion of the carriage which projects inwardly a distance sufficient to permit engagement with any of the stops 9. As will be understood from Figure 2, the rotational movements of the frame member or turret are indexed by a restraining pawl 22 in such manner as to insure that one of the stops 9 will be in proper alignment with the portion 21 of the carriage, after each actuation of the apparatus. Still making reference to Figure 2, it will be seen that the inner spaced end plate **3*a* is provided with equally spaced radial slots, shown at 23, which are adapted to cooperate with the suitably configured projecting portion of a pawl 22, said pawl being biased toward the edge of plate 3 by means of a torsion spring shown at 24**.

Figure 8:
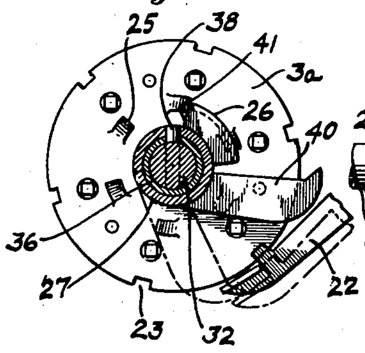
Figure 8 is a sectional view, taken on line 8—8 of Figure 3.

Making particular reference to Figures 2, 3, 8, and 9, the turret actuating or stepping mechanism will now be described:

As appears in Figure 8, the inner turret end plate **3*a* is provided with a plurality of raised teeth 25 "struck-up" out of the plane of the plate 3*a* and corresponding in number with the six stops shown in the embodiment illustrated. Stepping of the turret is effected by cooperation between said teeth and an actuating pawl 26 which projects radially outwardly from a collar 27, said collar being urged toward the face of plate 3*a* by the spring 29**, in which latter connection see Figure 3.

Figure 9:
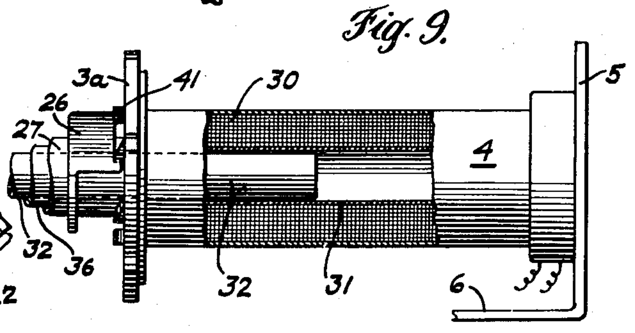
Figure 9 is a fragmentary, elevational view of a solenoid actuator employed in my device, portions being broken away to facilitate illustration.

In particular accordance with the present invention, and as best shown in Figure 9, which illustrates the drum 4 disassociated from the mechanism as a whole, the turret-actuating solenoid 30 is located within said drum, which location not only results in a substantial reduction in the overall dimensions of the tuning device, but further minimizes the complications in providing a driving connection between the solenoid and the turret. The coil 30 is wound upon a brass core 31, within which is reciprocably mounted a soft iron armature 32. Again making reference to Figures 1 and 3, it will be seen that the armature 32 normally projects outwardly from the winding 30 a considerable distance, and has its free extremity in close adjacency to the flange 5 of the main frame or base plate. At this extreme end, the armature is provided with a cross-head 33 which projects to either side of said armature and is suitably apertured for sliding movements upon a pair of guide rods 34—34. Opposite ends of these rods are fixed in the frame flanges 5 and 14, and a pair of compression springs 35—35 react between the flange 14 and the cross-head 33 in such manner as to urge the armature to its outer position, as shown.

Interposed between the pawl-carrying collar 27 and the armature 32, is a second non-rotatable sleeve 36 (see particularly Figures 3 and 8). The fixed, inner sleeve 36 is provided with a slot 37 along its upper edge (see Figure 3) into which slot projects a pin 38, carried by the armature 32. The cooperation between the slot 37 and pin 38 is such as to produce straight line movement of said pin, during reciprocations of the armature. A spiral cam track 39 is formed in the rotatably mounted collar 27, and as will be apparent from a comparison of Figures 3 and 8, inward movement of the armature 32 (with respect to the winding 30) serves to rotate both the sleeve 27 and the actuating pawl 26 in a clockwise direction. During this motion, the pawl 26 moves somewhat outwardly from the plate *3a*, against the pressure of spring 29, as said pawl rides up off the inclined faces of the adjacent teeth 25. This movement continues until a release lever 40, also carried by the sleeve 27, moves to the position shown in broken lines in Figure 8. As will be understood from a consideration of this figure, in moving from its full line to its broken line positions, the release lever 40 disengages the retaining pawl 22 from its associated slot 23, and the trailing face 41 of actuating pawl 26 engages the perpendicular drive face of the next succeeding tooth 25. When this movement has occurred, the winding 30 becomes de-energized, and the armature 32 is returned to the position shown in full lines in Figure 3, under the influence of springs 35. Such return movement, due to the cooperation of pin 38 with spiral slot 39, causes retrograde movement of the sleeve 27 and its associated pawl 26, that is, movement in a counter-clockwise direction, during which movement the turret is stepped through a 60° angle to bring the next succeeding stop 9 into a position to cooperate with the depending portion 21 of carriage 16 (see Figure 2). During this retrograde movement, the release lever 40 is disengaged from the pawl lever 22 and the projection formed on said pawl falls into the next succeeding slot 23, thereby completing an indexing movement of the turret.

It will be appreciated that the foregoing cycle of operations takes place very rapidly, and, as is common in such devices, a single push-button, shown diagrammatically at 42 in Figure 3, is actuated by the operator when it is desired to step the turret and change the frequency to which the apparatus will respond. Such frequency change is, of course, determined by the position of the particular stop 9 which has been brought into cooperative relation with carriage 16.

As best appears in Figure 3, a carriage-operating lever 43 is provided, said lever being pinned as at 44 to a portion of the fixed structure. There is a lost motion connection between lever 43 and armature 32, by virtue of the pin and slot shown at 45, 46, and it will be apparent that inward movement of the armature 32 will also move the carriage-operating lever 43 to the position shown in broken lines in Figure 3. A roller 47 is provided at the free end of lever 43, and during inward movement of the armature 32 this roller is brought into contact with the depending foot 19, thereby driving the carriage 16 out of cooperation with any of the stops 9.

With the exception of the novel construction and location of the solenoid drive means, the embodiment as thus far described is generally similar to known devices and, therefore, further detailed description thereof is not deemed necessary herein, except insofar as such mechanism cooperates with the novel structures now to be described.

In accordance with another feature of the invention, means is provided to restrain the carriage 16 as against return, frequency-determining movement, until such time as the stepping and indexing of the turret is completed. This restraint is accomplished by cooperation between the foot 19 and a bell crank lever 48 (see Figure 3) which lever is pivoted to the frame structure as at 49, and is urged in a clockwise direction by a torsion spring 50.

During movement of the carriage to the left, as viewed in Figures 1 and 3, the foot 19 depresses the longer arm of the bell crank 48 toward the position shown in full lines, and at the left-hand end of the carriage travel, said foot drops into a cutaway portion 50*a* formed at the free extremity of the longer arm of lever 48, after which said lever is free to move upwardly under the influence of spring 50, in which position it will maintain the carriage 16 and the slide 18 in its left-hand position, out of cooperation with any of the stops 9. Return movement of the armature 32 then steps and indexes the turret, as already described, but frequency-determining movement of the carriage 16 cannot occur until the pin 45, carried by armature 32 has returned sufficiently to strike the shorter arm of bell crank 48 and to move said arm a short distance in the counter-clockwise direction. This counter-clockwise movement occurs after completion of the turret indexing operation, and, as will be understood, trips the portion 50*a* of the longer arm of the bell crank out of cooperation with the foot 19, thereby permitting the return of the carriage against the stop indexed, under the influence of the afore-mentioned spring 20.

By virtue of this construction, sharp and proper tuning is assured, regardless of how close the carriage 16 may be to the indexed stop, when said carriage is in its withdrawn position, just prior to the return of said carriage. Prior devices have been subject to difficulties arising from the carriage returning and contacting the next succeeding stop, before the turret has completed its rotation, and the above described means for eliminating these difficulties is an important feature of the present invention.

Figure 7:
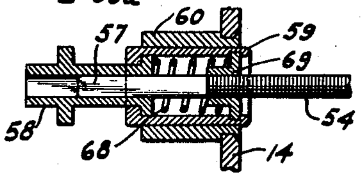
Figure 7 is an enlarged sectional view taken on the line 7—7 of Figure 4.

As brought out hereinabove, the stops 9 may be adjusted along the rod 7, in order to determine the desired tuning position of the carriage 16, and novel means is provided to effect a simple change-over between the manual and automatic modes of operation, said change-over occurring automatically after a predetermined number of push-button actuations. The pre-setting of the stops 9, so that desired stations may be automatically selected at will, is provided for in the following manner. Carried by a short extension 51, of the main frame 6, there is a control manual or knob 52 which, through a pair of gears shown at 53, is adapted to impart rotation to flexible cable 54 which passes through a guide tube 55 and has its free end extending into adjacency with squared heads 56, formed integrally with the threaded members 7 and extending through the turret mounting plate *3a*. As best seen in Figure 7, the cable 54 terminates in a rigid squared portion 57 upon which is slidingly mounted a socket 58 suitably configured to cooperate with the squared heads 56, in order to drive the same when said cable is rotated by means of the control manual 52. The socket 58 is mounted for slight reciprocation along portion 57 and within a sleeve 59, which sleeve is, in turn, free to slide within a collar 60, fixedly supported by the frame flange 14. As shown in Figure 1, the socket 58 is thus mounted and positioned in alignment with that one of the stops 9 which has been brought to the indexed position shown in Figure 2, that is, the position in which it is adapted to cooperate with the flange 21 provided on carriage 16.

Control knob 52 is mounted upon a suitable drive shaft 61, which shaft may be reciprocated within a sleeve 62, carried by the fixed frame structure. Spring 63 reacts between sleeve 62 and a collar formed on shaft 61 and normally urges said shaft to the outer position shown in the drawings. As clearly appears in Figure 2, the smaller of the two gears forming part of gear assembly 53 is encircled by a pair of retaining bands 64, sufficient spacing being left between the bands to permit engagement between the gears.

Figure 6:
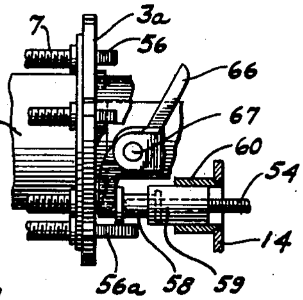

When it is desired to preselect the frequency to which a particular stop will tune the apparatus, the knob 52 is moved inwardly against the pressure of spring 63 and, by virtue of driving engagement between the larger of the two drive gears and one of the retaining bands 64, this inward motion is transmitted to the flexible cable 54 which, in turn, moves the sleeve 59 toward the aligned head 56 of one of the threaded members 7. Such inward movement of sleeve 59 drives the socket 58 to the left, through a compression spring 68 which reacts between the socket and a flange 69, fixed to sleeve 59. This position is illustrated in Figure 6, and it will be evident that such inward movement of the control knob effects driving engagement between the socket 58 and said adjacent squared head. In this position, the aligned one of the threaded members 7 may be rotated, in response to rotations of the control knob 52. Such rotation will serve to move the stop 9 along the threaded member 7, said stop being restrained as against rotation with the member 7 by virtue of the engagement between the stop lug 10 and the rod 11, as previously described. The stops may be adjusted progressively, in accordance with the foregoing operation, as they are brought into their indexed position in alignment with the socket 58.

Figure 4:
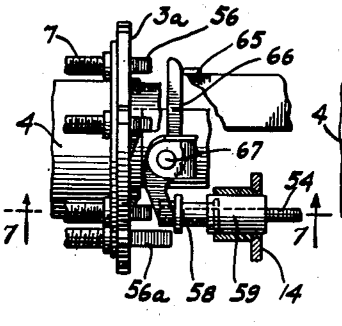
Figures 4, 5 and 6 are fragmentary plan views, illustrating three different positions of a portion of the operating linkage.
Figure 5:
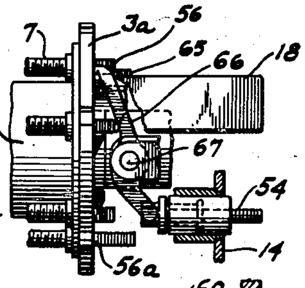

It will be observed that one of the squared heads designated 56*a* in Figures 4 to 6, inclusive, extends outwardly from the plate 3*a* beyond the ends of the other heads 56, and this longer extension 56*a* is utilized to provide manual tuning of the apparatus when desired, and in the manner now set forth. The apparatus is such that it is automatically conditioned for the manual mode of operation once during each complete revolution of the turret 2. When the longer extension 56*a* has been brought into the indexed position, it is in alignment with the socket 58 which socket, in its normal position shown in Figure 4, extends sufficiently toward the plate 3*a* to permit driving engagement between said socket and extension 56*a*, without inward movement of the knob 52 or, in fact, any attention on the part of the operator. Provision has been made to retract the link 58 to permit entrance of the extension 56*a* thereinto, when the manual position is reached, as well as to accommodate disengagement between said members, when it is desired to again tune the device automatically by means of the push-button 42 and the solenoid drive.

As shown in Figures 3 to 5, the carriage extension 18 is provided with a drive lug 65 which is brought into engagement with one end of a socket release lever 66, during movements of the carriage toward the left-hand, free position, illustrated in Figure 3. Release lever 65 is pivoted to the frame structure intermediate its ends, as at 67, and the lower end of said lever is adapted to bear against a drive flange formed on the socket 58. As will be apparent from a comparison of Figures 4 and 5, the afore-described movement of the carriage extension 18 to the left, which occurs during each automatic actuation of the apparatus, brings the lug 65 into engagement with one end of the socket release lever 66 and thereby moves the socket from its normal position, as shown in Figure 4, to a retracted position shown in Figure 5. Compression of the spring 68 occurs during this retractive movement of the socket. This retraction of the socket 56, taking place with each automatic actuation of the mechanism, insures the fact that the socket 58 will be retracted both when the longer extension 56*a* is brought into registry therewith, and when it is desired to disengage the manual drive and return to the automatic mode of operation. It should be understood that the lug 65 is so positioned on the carriage extension 18 as to effect retraction of the socket 58 during inward movement of the armature 32. As pointed out above, no movement of the turret occurs during inward movement of the armature, stepping taking place rather during the outward or return position of the stroke, and it will therefore be understood that while the apparatus is automatically conditioned for the manual mode of operation with every sixth indexing movement of the turret, there can be no interference with the freedom to effect the next succeeding stroke, since the socket 58 is in its retracted position during each indexing movement of the stop-carrying turret.

In the form illustrated, it is not intended that the mechanism should be power driven, when the knob 52 and sleeve 59 have been moved inwardly, to permit engagement between the socket 58 and the shorter heads 56, but it will be understood that as soon as the operator releases the knob 52, the socket and the sleeve 59 are returned to the normal position shown in Figure 4, after which the release lever will function as shown in Figure 5, and as above set forth. However, if freedom for power actuation is desired, even when the knob 52 is held in, provision for further retractive travel of the socket 58 may readily be made.

From the foregoing description, it will be appreciated that the present invention provides a novel tuning apparatus which is not only capable of extremely simple change-over between the manual and automatic modes of operation, without effort or attention on the part of the operator, but in which the preselection of the position of the various stops may be readily and positively effected.

Also, for the reasons fully set forth hereinabove, the device is unusually compact and is further advantageous in that it is of such nature as to insure completion of the stop-indexing operation prior to any tuning movement of the frequency-determining elements.

I claim:

1. In radio apparatus, movable tuning means, a rotatable member carrying a plurality of stops each adapted for individual cooperation with said tuning means to establish a predetermined position thereof in correspondence with a desired preselected frequency, a solenoid within said rotatable member, an armature extending within said solenoid and mounted for reciprocation along the rotational axis of said member, and mechanism adapted to effect step-by-step rotational movements of said member in response to reciprocation of said armature.

2. In radio apparatus, movable tuning means, a rotatable member carrying a plurality of stops each adapted for individual cooperation with said tuning means to establish a predetermined position thereof in correspondence with a desired preselected frequency, a solenoid within said rotatable member, an armature extending within said solenoid and mounted for reciprocation along the rotational axis of said member, and mechanism adapted to effect step-by-step rotational movements of said member in response to reciprocation of said armature, said mechanism comprising means for storing energy during movements of said armature in one direction and means for utilizing the energy so stored to drive said member during movement of said armature in the other direction.

3. In radio tuning apparatus capable of both manual and automatic tuning adjustment, a progressively movable element adapted to effect automatic tuning adjustment with each progressive step, means for effecting manual tuning adjustment when said movable element has reached a predetermined position, said means including a drive member adapted to be moved into engagement with a portion of said element when said predetermined position has been reached, and means for moving said drive member to effect disengagement thereof from said portion in response to the initiation of the next succeeding progressive step.

4. In radio tuning appartus capable of both manual and automatic tuning adjustment, a progressively movable element adapted to effect automatic tuning adjustment with each progressive step, means for effecting manual tuning adjustment when said movable element has reached a predetermined position, said means including a drive member adapted to be advanced into engagement with a portion of said element when said predetermined position has been reached, and means for retracting said drive member to effect disengagement thereof from said portion prior to the next succeeding progressive step.

5. In radio tuning apparatus capable of both manual and automatic tuning adjustment, tunable means, a rotatable element carrying a plurality of stops each adapted for individual cooperation with said tunable means to adjust the same to a desired preselected frequency, means for rotating said element to automatically effect progressive cooperation between the various individual stops and said tunable means, means for effecting manual tuning adjustment when a particular one of said stops has been brought into cooperation with said tunable means, said last means including a stop-adjusting member adapted to be moved into driving engagement with said one stop as said stop reaches cooperative position, and means for moving said drive member to effect disengagement thereof from said one stop upon the next succeeding rotative movement of said element.

6. In radio apparatus, movable tuning means, a movable frame member carrying a plurality of stops each adapted for individual cooperation with said tuning means to establish a predetermined position thereof in correspondence with a desired pre-selected frequency, one of said stops normally being positioned to cooperate with said tuning means, apparatus for moving said tuning means in one direction out of cooperation with the stops of said member and for thereafter effecting indexing movement of said member to bring another stop into position for cooperation with said tuning means, means for returning said tuning means into cooperative relation with the stop so indexed, restraining means preventing return movement of the tuning means during indexing movement of said member, and apparatus adapted to render the restraining means ineffective upon completion of said indexing movement.

JOSEPH E. LASCHENSKI.

REFERENCES CITED

The following references are of record in the file of this patent:

UNITED STATES PATENTS

| Number | Name | Date |
|---|---|---|
| 2,310,720 | Wandrey | Feb. 9, 1943 |
| 2,313,653 | Lyman et al. | Mar. 9, 1943 |
| 2,342,691 | Plensler | Feb. 29, 1944 |
| 2,357,775 | Tyzzer | Sept. 5, 1944 |